United States Patent [19]

Dressel et al.

[11] Patent Number: 5,290,582

[45] Date of Patent: Mar. 1, 1994

[54] HOMOGENOUS, STABLE FLAVORED MILK AND PROCESS

[75] Inventors: Phillip F. Dressel, St. Louis County, Mo.; Robert D. Bowen, Jr., Loudon County, Tenn.; Larry D. Ellis, St. Louis County, Mo.; Milford D. Bonner, St. Louis County, Mo.; Philip C. Dressel, St. Louis County, Mo.

[73] Assignee: Consolidated Flavor Corporation, Bridgeton, Mo.

[21] Appl. No.: 990,754

[22] Filed: Dec. 15, 1992

Related U.S. Application Data

[63] Continuation-in-part of Ser. No. 733,349, Jul. 22, 1991, abandoned.

[51] Int. Cl.⁵ .............................. A23C 9/156
[52] U.S. Cl. .................................. 426/584; 426/521; 426/555; 426/573; 426/590; 426/593; 426/650; 426/654
[58] Field of Search ............... 426/650, 654, 590, 593, 426/584, 521, 555, 573

[56] References Cited

U.S. PATENT DOCUMENTS

| | | |
|---|---|---|
| 2,850,388 | 9/1958 | Peebles et al. |
| 3,027,257 | 3/1962 | Shenkenberg |
| 3,118,769 | 1/1964 | Pletcher |
| 3,860,730 | 1/1975 | Warkentin |
| 4,397,927 | 8/1983 | Brog |
| 4,910,035 | 3/1990 | Ellis |
| 4,980,193 | 12/1990 | Tuason, Jr. et al. |

*Primary Examiner*—Helen F. Pratt
*Attorney, Agent, or Firm*—Polster, Lieder, Woodruff & Lucchesi

[57] ABSTRACT

A process for making a stable flavored milk product which meets the CFR regulations for milk and a dry powder for use in the process. The product is a flavored, non-agglomerated powder containing flavoring, color, Kappa and/or Iota carrageenan, and the milk proteins, casein and lactalbumin. The powder, when added to water, makes a stabilized liquid syrup with no wasteful foam during processing. Addition of the water based syrup to milk requires less aggitation than adding powders directly to milk, this resulting in less foaming and waste. The process provides for adding the liquid phase stabilization system to milk prior to homogenization to produce a stable, flavored milk drink.

30 Claims, No Drawings

HOMOGENOUS, STABLE FLAVORED MILK AND PROCESS

CROSS-REFERENCE INFORMATION

This application is a continuation-in-part of U.S. Ser. No. 07/733,349, filed Jul. 22, 1991 now abandoned.

BACKGROUND OF THE INVENTION

This invention relates to a dry non-agglomerated flavored, blended powder for mixing with water and sweetener to produce a syrup which is added to milk prior to pasteurization to make a stable, flavored milk drink.

Presently there are Federal Specifications for milk, low fat milk and skim milk. The requirements Br milk are set forth in 21 C.F.R. Ch.1, §131 et sec. The contents of 21 C.F.R. §131 110 and 21 C.F.R. §131.143 are as follow:

§131.110 Milk (a) Description

Milk is the lacteal secretion, practically free from colostrum, obtained by the complete milking of one or more healthy cows. Milk that is in final package form for beverage use shall have been pasteurized or ultrapasteurized, and shall contain not less than 8¼ percent milk solids not fat and not less than 3¼ percent milkfat. Milk may have been adjusted by separating part of the milkfat therefrom, or by adding thereto cream, concentrated milk, dry whole milk, skim milk, concentrated skim milk, or nonfat dry milk. Milk may be homogenized.

(b) Vitamin Addition

Optional (1) If added, vitamin A shall be present in such quantity that each quart of the food contains not less than 2000 International Units thereof within limits of good manufacturing practice.

(2) If added, vitamin D shall be present in such quantity that each quart of the food contains 400 International Units thereof within limits of good manufacturing practice.

(c) Optional Ingredients

The following safe and suitable ingredients may be used:
(1) Carriers for vitamins A and D.
(2) Characterizing flavoring ingredients (with or without coloring, nutritive sweetener, emulsifiers, and stabilizers) as follows:
 (i) Fruit and fruit juice (including concentrated fruit and fruit juice).
 (ii) Natural and artificial food flavorings.

(d) Methods of Analysis

Referenced methods are from "Official Analytical Chemists," 13th Ed. (1980), which is incorporated by reference. Copies may be obtained from the Association of Official Analytical Chemists, 2200 wilson Blvd., suite 400, Arlington, Va. 22201-3301, or may be examined at the Office of the Federal Register, 1100 L. St. NW., Washington, DC 20408.
(1) Milkfat content—"Fat, Roese-Gottlieb Method-Official Final Action," Section 16.059.

(2) Milk solids non fat content—Calculated by subtracting the milk fat content from the total solids content as determined by the method "Total Solids, Method I-Official Final Action," section 16.032.
(3) Vitamin D content—"Vitamin D-Official Final Action," sections 43.195–43.208.

(e) Nomenclature

The name of the food is "milk". The name of the food shall be accompanied on the label by a declaration indicating the presence of any characterizing flavoring, as specified in §101.22 of this chapter.

(1) The following terms shall accompany the name of the food wherever it appears on the principal display panel or panels or the label in letters not less than one-half the height of the letters used in such name:
 (i) If vitamins are added, the phrase "vitamin D added", or "vitamin A and D" or "vitamins A and D added", as is appropriate. The word "vitamin" may be abbreviated "vit.".
 (ii) The word "ultra-pasteurized" if the food has been ultra-pasteurized.
(2) The following terms may appear on the label:
 (i) The work "pasteurized" if the food has been pasteurized.
 (ii) The word "homogenized" if the food has been homogenized.

(f) Label declaration

When used in the food, each of the ingredients specified in paragraphs (b) and (c)(2) of this section shall be declared on the label as required by the applicable sections of Part 101 of this chapter.

[47 FR 14360, Mar. 15, 1977, as amended at 47 FR 11822, Mar. 19, 1982; 49 Fr 10090, Mar. 19, 1984; 54 FR 24892, Jun. 12, 1989]

§131.143 Skim Milk (a) Description

Skim milk is milk from which sufficient milkfat has been removed to reduce its milkfat content to less than 0.5 percent. Skim milk that is in final package form for beverage use shall have been pasteurized or ultra-pasteurized, shall contain added vitamin A as prescribed by paragraph (b) of this section, and shall contain not less than 8¼ percent milk solids not fat. Skim milk may be homogenized.

(b) Vitamin addition (1) Vitamin A shall be present in such quantity that each quart of the food contains not less than 2000 International Units thereof within limits of good manufacturing practice.
(2) Addition of vitamin D is optional. If added, vitamin D shall be present in such quantity that each quart of the food contains 400 International Units thereof within limits of good manufacturing practice.

(c) Optional Ingredients

The following safe and suitable ingredients may be used:
(1) Carriers for vitamins A and D.
(2) Concentrated skim milk, nonfat dry milk, or other milk derived ingredients to increase the nonfat solids content of the food: Provided, That the ratio of protein to total nonfat solids of the food, and the protein efficiency ratio of all protein present, shall not be decreased as a result of adding such ingredients.

(3) When one or more of the optional milk derived ingredients in paragraph (c)(2) of this section are used, emulsifiers, stabilizers, or a combination of both, in an amount not more than 2 percent by weight of the solid in such ingredients.

(4) Characterizing flavoring ingredients (with or without coloring, nutritive sweetener, emulsifiers, and stabilizers) as follows:
  (i) Fruit and fruit juice (including concentrated fruit and fruit juice).
  (ii) Natural and artificial food flavoring.

(d) Method of Analysis

Referenced method are from "Official Methods of analysis of the Association of Official Analytical Chemists," 13th Ed. (1980), which is incorporated by reference. Copies may be obtained from the Association of Official Analytical Chemists, 2200 Wilson Blvd., Suite 400, Arlington, Va. 22201-3301, or may be examined at the Office of the Federal Register, 1100 L. St. NW., Washington, DC 20408.

(1) Milkfat content—"Fat, Roese-Gottlieb Method-Official Final Action," Section 16,059.

(2) Milk solids not fat content (or total nonfat solids content)—Calculated by subtracting the milkfat content from the total solids content as determined by the method "Total Solids, Method I-Official Final Action," section 16.032.

(3) Vitamin D content—"Vitamin D-Official Final Action," sections 43.195–43.208.

(e) Nomenclature

The name of the food is "Skim milk" or alternatively "Nonfat milk". The name of the food shall appear on the label in type of uniform size, style, and color. The name of the food shall be accompanied on the label by a declaration indicating the presence of any characterizing flavoring, as specified in §101.22 of this chapter.

(1) The following terms shall accompany the name of the food whenever it appears on the principal display panel or panels of the label in letters not less than one-half of the height of the letters used in such name:
  (i) The phrase "vitamin A" or "vitamin A added", or, if vitamin D is added, the phrase "vitamins A and D" or "vitamins A and D added". The word "vitamin" may be abbreviated "vit.".
  (ii) The word "ultra-pasteurized" if the food has been ultra-pasteurized.
  (iii) The phrase "with added milk solids not fat" if the food contains not less than 10 percent milk-derived nonfat solids.

(2) The following terms may appear on the label:
  (i) The work "pasteurized" if the food has been pasteurized.
  (ii) The work "homogenized" if the food has been homogenized.

(f) Label Declaration

When used in the food, each of the ingredients specified in paragraphs (b)(2) and (c)(2), (3), and (4) of this section shall be declared on the label as required by applicable sections of Part 101 of this chapter.

The Specifications require that the products have specific minimum amounts of milk solids non-fat and final protein levels and a minimum protein efficiency ratio. The Specifications also allow certain flavorings, colorings, emulsifiers, sweeteners and stabilizers to be added as optional ingredients, as long as the ratio of protein to total solids and the protein efficiency ratio of all protein present in the final product is not decreased below the minimum specified by law.

A present method for making chocolate milk, for example, allows the addition of nutritive sweeteners to the chocolate milk. However, this addition often dilutes the milk to the point where the finished product is below the legal limits on milk solids non-fat and protein. Accordingly, a principal advantage of the present invention is that it allows the dairy to adjust its milk solids non-fat and protein level to meet the Federal Specification for milk. The syrup-powder blend corrects this problem by having additional milk solids non-fat and protein in the blend and thus the final product is up to the legal requirements to be called a milk product.

Another advantage of the present invention is that by making a syrup blend first, better hydration of the stabilizers occurs which makes the finished product much more uniform because of better suspension of the cocoa particles. An indirect benefit of increasing the protein level in the finished drink is that the stabilizers react more completely and thus cause the finished drink to be more stable.

Stabilization is defined as the ability to suspend non-soluble particles, such as the flavoring, cocoa, in the milk to provide a homogeneous color and flavor. Stabilizers or suspending agents such as carrageenans, are used to suspend or stabilize the flavoring in the liquids and keep the flavoring from separating.

Suspending agents, such as carrageenans, both Kappa and Iota carrageenan, react with milk proteins to form a web-like structure throughout the milk. Furthermore, a better reaction has been observed by the inventors by using only selected milk proteins, e.g., isolated casein milk protein or isolated lactalbumin protein. Cocoa particles or other insoluble flavoring materials are then trapped upon this webbing throughout the milk. This allows for a homogeous flavored milk.

TYPICAL PRIOR ART PROCESS

In the prior art processes for suspending flavorings in milk, carrageenan is introduced as a powder and is very difficult to mix in the milk because of its inherent "gumminess". Severe agitation is needed to disperse the carrageenans. Agitation causes excess foaming and protein denaturization. The damaged proteins lessen the functionality of the carrageenan and the excess foaming must be disposed of. The disposal also is a problem because it can overload sewer systems and waste disposal plants.

The actual suspension reaction takes place during pasteurization, since the carrageenans are activated by temperatures above 160° F. The prior art process results from a reaction between the carrageenans and all milk proteins to form the web, even though some proteins are not as effective as others in forming the reactor.

An example of a current manufacture of chocolate milk is as follows: 25 lbs. of cocoa powder, 275 lbs. of sugar, and 5 lbs of carrageenans are added to 500 gallons of raw milk and vigorously agitated. This agitation creates tremendous foaming. This foam is removed and disposed of creating loss of product. The resulting mixture is then pasteurized forming the carrageenan-protein webbing with the insoluble cocoa particles trapped therein.

ADVANTAGES OF THE PRESENT INVENTION

By first blending the dry ingredients into a water based syrup, the amount of air which is incorporated into the finished product when the syrup is mixed with the liquid milk is greatly reduced as compared to adding all of the materials directly into the milk. This allows for easy processing of the product, more even flow through the pasteurizing equipment, and greatly reduces the number of micro particles of air which occur during the homogenization process. The reduction of air particles in the product improves the long term stability and appearance of the product in the finished containers or milk bottles. Also, since there is less air in the product, the filling procedure is made more reliable and accurate and reduces the number of short filled containers. This process also results in less foam in processing, resulting in less waste left in processing and storage equipment, which reduces waste being disposed of down the sewer, with resulting drop in sewer treatment expense.

Also, by making up a syrup and adding the syrup to the milk the syrup materials go into the solution in the milk much faster than if all dry material were added to the milk. This greatly reduces the total mixing time a dairy must use and thus cuts down on the overall mixing, processing and filling time in the dairy.

Another advantage of the dairy making a syrup prior to mixing a flavoring with the milk is that the color and flavor of the final product is enhanced because of the greater reaction time of the powder with the water and sweeteners during the heating process of the syrup. When the solids are added to the milk as is presently done, only approximately one minute of time is used in the heating stage of the milk which is not enough to develop all of the natural flavor and color of the cocoa.

Another advantage of the present system is that is incorporates those milk proteins that most efficiency react with the stabilizers.

Use of consumer chocolate syrups or agglomerated cocoa mixes conventionally sold in grocery stores to the public do not result in a stable product when mixed with milk because they do not contain carrageenan. Thus, these products are not useful to a commercial dairy and are not relevant to this invention.

A critical factor in commercially manufactured flavored milks is that particle suspension is critical over long periods of time. This is difficult to achieve with present procedures and it is this problem that the present invention attacks.

These and other objects and advantages will become apparent to those versed in the art from the following description.

SUMMARY OF THE INVENTION

The invention comprises a flavored, non-agglomerated powder containing flavoring, color, stabilizers, and flavor carriers and fillers and further comprises a water based stabilized liquid syrup containing Kappa and/or Iota carrageenan, flavors, preferably cocoa, milk proteins and milk sugar. The invention also comprises a process of making a flavored milk by adding this liquid phase stabilization system to milk prior to homogenization to produce a stable, flavored milk without foaming.

DESCRIPTION OF THE PREFERRED EMBODIMENT

The present invention provides for the introduction of a liquid phase stabilization system to the milk. This stabilization system is comprised of several preferred ingredients.

Our liquid stabilization product contains the following:
Lactose
Lactalbumin
Casein (it may be precipitated by calcium, sodium, or magnesium)
Water
Carrageenan (it may be comprised of either Kappa or Iota carrageenan or both)
It may contain the following:
Sugars (defined as nutritive sweeteners
Salt
Vitamins
All other optional ingredients as provided by the Code of Federal Regulations, Title 21, §131 titled Milk and Cream This would include but is not limited to:

| | |
|---|---|
| Cocoa Powder | Artificial Colors |
| Artificial Flavors | Natural Colors |
| Natural Flavors | Chocolate |
| Thickening Agents | Fruit and Fruit Juices |

It may not contain any ingredient, chemical or food that is not permitted for use in milk in the United States.

For example, many commercial flavoring syrups contain hydrogen peroxide as an ingredient to sterilize the bacteria loads found in chocolate. However, these types of syrups are not within the scope of our invention because hydrogen peroxide is not permitted in milk in the United States as defined by the Code of Federal Regulations.

The essence of our invention is to place the stabilization system into a liquid phase by adding the following essential ingredients into a water solution:
lactose (from about 70 to 80%, preferably about 75.40% by weight),
casein (from about 0 to 14.07%, preferably about 8.10% by weight),
lactalbumin (from about 7.28 to 35% preferably about 13.25% by weight),
carrageenan (from about 2 to 8% preferably about 3.25% by weight.

In the liquid system after it has been prepared, the milk protein level must be at least 2.97% by weight with a protein efficiency ratio (PER) of at least 2.7 to comply within the Code of Federal Regulations (CFR). The milk solids non-fat must be at least 8.25% by weight.

The following equation provides the proper amount of protein and protein efficiency in the liquid stabilization system. The percentages listed are percentages by weight of the liquid stabilization system:
Lactalbumin must be at least 0.594% of the system.
Casein cannot be more than 2.376% of the system.
The combined protein must be at least 1.46% of the system. As the lactalbumin level rises, the amount of casein decreases; so the amount of casein necessary is:
Casein = 2.97% minus the percentage of lactalbumin of total system
Lactalbumin = 2.97% minus the percentage of casein of the total system Lactose = 5.28% of the total system
Carrageenan = 0.25% of the total system
Water = 91.50% of the total system
Following are examples of our invention:

EXAMPLE No. 1

An example of the aforestated system for making standardized flavored milk is as follows:

| Water | 15 Gallons |
|---|---|
| Kappa Carrageenan | 0.34 lbs. |
| Isolated casein milk protein | 2.0 lbs. |
| Isolated lactalbumin protein | 2.04 lbs. |
| Granulated lactose | 8.76 lbs. |

These ingredients are blended together in a lightening mixer for two (2) minutes and form a stabilized liquid system. The system is added to 82.5 gallons of raw milk with a fat content of 4.25%. Fifty (50) pounds of granulated sugar is then added to the stabilized milk. Fifteen (15) pounds of seedless strawberry puree is added to the stabilized, sweetened raw milk. The puree contains about 50% solids by weight.

The foregoing mixture of ingredients is pasteurized at 185° F. for twenty-two (22) seconds and then quickly cooled. The result is 105 gallons of product that meets the standards of 21 C.F.R. §131 et sec. for milk with a fat content of 3.25% and is flavored strawberry. The flavoring will not settle out, nor will the fat separate from the solids. Moreover, the product will be shelf stable until the milk sours. This is an example of a stabilized, flavored, sweetened milk product which meets CFR requirements.

EXAMPLE NO. 2

In another example for making chocolate skim milk, the following ingredients are combined:

| Water | 15 Gallons |
|---|---|
| Kappa and Iota carrageenan | 0.25 lbs. |
| Isolated casein milk protein | 0.8 lbs. |
| Isolated lactalbumin milk protein | 3.63 lbs. |
| Granulated lactose | 8.76 lbs. |
| Granulated sugar | 60.00 lbs. |
| Cocoa | 10.00 lbs. |

The foregoing ingredients are mixed together in a lightening mixer for two (2) minutes resulting in a liquid sweetened flavored stabilization system which is then added to 82.5 gallons of raw skim milk. The product is then ultra high pasteurized, resulting in a stable, homogeneous chocolate skim milk that will have cocoa particles suspended throughout and which will not separate and settle to the bottom of the container.

In the foregoing examples, the lactose is necessary since it produces superior flavor in the end product. Furthermore, lactose, when blended with the milk proteins and carrageenan, provides a better dispersion in the water to form a liquid stabilization system.

In the examples, the vigorous agitation of the products occurs when the solid ingredients are added to the water to create the liquid stabilization system. Agitation at this point in the process does not cause foaming, and therefore, no product waste or loss. Also, at this point in the process other optional ingredients and nutritious sweeteners as permitted by 21 C.F.R. §131 et seq. may be added to raw milk, which has been standardized for solids and fats content as specified by the 21 §C.F.R. §131. This results in little foam production.

The flavoring and color material include cocoa solids, natural flavors, artificial flavors, salt, and natural and artificial colors.

Specific flavor ingredients are the following:

| | |
|---|---|
| Natural processed cocoa | Natural root beer flavors |
| Cocoa processed with alkali | Artificial root beer flavors |
| Malt | Natural coffee flavors |
| Vanillin | Artificial coffee flavors |
| Vanilla | Natural raspberry flavors |
| Salt | Artificial raspberry flavors |
| Artificial chocolate flavors | Orange juice |
| Natural chocolate flavors | Apple juice |
| Natural orange flavors | Grape juice |
| Artificial orange flavors | Natural grape flavors |
| Natural strawberry flavors | Natural banana flavors |
| Artificial vanilla flavors | Artificial banana flavors |
| Artificial egg nog flavors | Natural cherry flavors |
| Natural egg nog flavors | Artificial cherry flavors | specific coloring ingredients are as follows:

| | | |
|---|---|---|
| Red #40 | Yellow #5 | Annatto |
| Blue #1 | Caramel color | Carmine |
| Yellow #6 | Tumeric | Beet color |
| Grape skin extract | | |

The stabilizers are selected from the group consisting of Iota and Kappa carrageenan and mixtures thereof.

Fillers can include nutritive sweeteners, milk derived ingredients, and mixtures thereof.

ALTERNATIVE EMBODIMENT

In this embodiment of the invention, the product comprises a dry non-agglomerated, flavored blended powder which consists of about 15 to about 60% by weight dsb of a flavoring or color material, preferably about 36% flavoring material, about 2 to about 6 percent stabilizer, preferably about 5% stabilizer, and fillers to 100%.

The dry, non-agglomerated, flavored, blended powder mix can contain dry acids and buffers, such as citric acid and sodium citrate, to adjust the pH to any desired level.

The aforestated powder mix is stored by the diary and mixed on a daily or other routine, as needed, basis. Approximately 8 to 11% by weight of the non-agglomerated flavored, blended, powder product is mixed with about 34 to 37% high fructose syrup having about 71% fructose and about 55 to 58% by weight water. The process of mixing is as follows:

1) Approximately 15 gallons of water should be metered into processing vat. Heat water to 80° F.
2) Add 71 pounds of liquid high fructose corn syrup of about 71% fructose and mix well for approximately 3 to 5 minutes.
3) Add 18 pounds of powder to high fructose corn syrup and water mixture. heat the product until the product is well mixed (mixing will take approximately 15 minutes and heating should raise product to approximately 90° F. to 100° F.).

When the syrup is to be mixed with milk, from about 23 to about 25 gallons of syrup is mixed with about 82 to about 80 gallons of whole milk to produce a syrup mix. The mixing procedure is as follows:

1) Raw milk should be standardized for proper butterfat before mixing and stored at 35° F. It is standardized to about between 0.25 of 1% to 4.2% butterfat.
2) After the syrup has been properly mixed and reaches a temperature of 90° F., it should be pumped into the raw standardize for butterfat milk.
3) This mixture of milk and syrup should be allowed to mix under good agitation for 5 to 10 minutes until the temperature of the mix is about 40° F.
4) After the product has mixed well it is ready to pasteurize.

The syrup mix then is passed through a pasteurizer under the following conditions:
1) If a high temperature short time pasteurizer is used the milk-syrup mixture should be pumped to the pasteurizer at a temperature of approximate 40° F.
2) the pasteurizing temperature should be set at between 166° F. to 186° F. with the total holding time at these temperatures to be from a minimum of 17 seconds to a maximum of 120seconds.
3) The product does not have to homogenized, but if desired, a total pressure of 500 to 1000 p.s.i. is all that is required.
4) The product is then cooled to 40° F. and pumped from the pasteurizer to a holding tank for bottling.

If vat pasteurization is desired, the following procedures should be used:
1) The desired amount of prestandardized butterfat milk should be pumped into a pasteurizing vat or kettle. The milk should begin to be heated at this point.
2) Syrup should be added to his warm milk and mixed well. Heating should continue.
3) The product should be heated to about 140° F. to 160° F. and held at the temperature for about 30 to about 35 minutes, preferably about 30 minutes.
4) The product can be pumped to the homogenizer with the total pressure set at between 500 to 1000 p.s.i.
5) The product should then be pumped to a holding tank for bottling.

This invention is intended to cover all changes and modifications of the example of the invention herein chosen for purposes of the disclosure which do not constitute departures from the spirit and scope of the invention.

Having thus described the invention, what is claimed and desired to be secured by Letters Patent is:

1. A liquid, flavored, stabilization system to be added to standardized raw milk prior to pasteurization to make a flavored milk comprising by weight based on the total weight of the system:
   (a) about 5 to about 10% flavoring material;
   (b) about 1.35 to about 6% milk proteins selected from the group consisting of lactalbumin, and mixtures of casein and lactalbumin;
   (c) about 3 to about 8% lactose;
   (d) about 0.01 to about 0.08% stabilizer, selected from the group consisting of kappa carrageenan and mixtures of kappa carrageenan and iota carrageenan;
   (e) about 40 to about 90% water.

2. The system of claim 1 wherein the lactalbumin is at least 0.594% of the total system.

3. The system of claim 1 wherein the milk protein is a mixture of lactalbumin and casein, the casein being less than 2.376% of the total system.

4. The system of claim 1 wherein the milk protein is a mixture of lactalbumin and casein, the casein and lactalbumin being at least 1.46% of the system.

5. The system of claim 1 wherein the milk protein is a mixture of lactalbumin and casein, the lactalbumin being at least 0.594%, the casein being not more than 2.376% and the ratio of casein to lactalbumin is 2.97% minus the % of lactalbumin 2.97% minus the % of casein.

6. The system of claim 1 wherein the carrageenan is 0.25% of the system.

7. The system of claim 1 wherein the lactose is 5.28% of the system.

8. The system of claim 1 wherein the flavoring is selected from the group consisting of cocoa solids, artificial flavors, natural flavors, and salts.

9. A liquid stabilization system to be added to standardized raw milk to which a flavoring material can be added to make a stable, flavored milk comprising:
   (a) about 90.1% of water, w/w;
   (b) about 0.25% stabilizer, w/w, selected from the group consisting of kappa carrageenan and a mixture of iota and kappa carrageenan;
   (c) about 1.50% casein, w/w;
   (d) about 1.53% lactalbumin, w/w; and
   (e) about 6.5% granulated lactose, w/w.

10. A flavored, sweetened, liquid stabilization system to be added to standardized raw milk to make a stable, flavored milk comprising:
    (a) about 4.9% w/w flavoring material;
    (b) about 29% w/w granulated sugar;
    (c) about 4.3% w/w lactose;
    (d) about 0.1% w/w of a stabilizer mixture of kappa and iota carrageenan;
    (e) about 1.7% w/w lactalbumin;
    (f) about 0.39% w/w casein; and
    (g) about 59% w/w water.

11. The stabilization system of claim 10 wherein the flavoring material is cocoa powder.

12. A process for making a stable, flavored milk comprising the steps of:
    (a) mixing dry lactose, dry milk proteins selected for the group consisting of lactalbumin and a mixture of lactalbumin and casein, and dry stabilizers selected form the group consisting of kappa carrageenan and a mixture of kappa and iota carrageenan and water to produce a liquid stabilization system;
    (b) dispersing the dry ingredients in the water to form an aqueous system;
    (c) adding the liquid stabilization system to milk;
    (d) adding sweeteners to the stabilized milk;
    (e) adding flavoring material to the sweetened, stabilized milk;
    (f) pasteurizing the flavored, sweetened, stabilized mixture; and,
    (g) cooling the flavored, sweetened, stabilized mixture.

13. The process of claim 12 wherein the sweetener is granulated sugar.

14. The process of claim 12 wherein the step of pasteurizing further comprises pasteurizing for about twenty-two seconds at about 185° F.

15. A process for making a stabilized, sweetened, flavored milk comprising the steps of:
    (a) mixing a dry flavoring material, a dry sweetener, lactose, dry stabilizer material including kappa carrageenan, milk proteins selected from the group consisting of lactalbumin and mixtures of casein and lactalbumin, and water to make a sweetened, flavored, liquid stabilizer system;

(b) adding said liquid stabilizer system to skim milk; and (c) pasteurizing the stabilized mixture.

16. The process of claim 15 wherein said stabilized milk is skim milk.

17. The process of claim 15 wherein said stabilizer is selected from the group consisting of kappa carrageenan and a mixture of iota and kappa carrageenan.

18. The process of claim 15 wherein the step of pasteurization further comprises ultra high temperature pasteurization.

19. A dry, non-agglomerated flavored, blended powder for mixing with water and sweetener to be added to milk prior to pasteurization comprising by weight (dsb)
   (a) about 15 to about 60% flavoring material selected from the group consisting of cocoa solids, artificial flavors, natural flavors and salt,
   (b) about 2% to about 6% of a stabilizer mixture including carrageenan selected from the group consisting of kappa carrageenan and a mixture of kappa and iota carrageenan and milk proteins selected from the group consisting of lactalbumin and mixtures of lactalbumin and casein, and 20. A method of making a flavored fluid dairy product comprising the steps of:
   (a) mixing a sweetener, water and a dry non-agglomerated flavored powder selected from the group consisting of lactalbumin and mixtures of casein and lactalbumin, sweetened flavored syrup;
   (b) heating the flavored sweetened syrup at a temperature of about 90° F. to about 100° F. for about 5 to about 15 minutes;
   (c) mixing the syrup with milk;
   (d) pasteurizing the syrup-milk product, and
   (e) homogenizing the milk-syrup mix to produce a stable finished flavored fluid dairy product.

21. The method of claim 20 wherein the dry non-agglomerated flavored powder contains about 15-60% flavoring, about 2-6% stabilizers and fillers to bring the blend to 100%.

22. The method of claim 20 including the step of homogenizing the milk-syrup mix after pasteurization.

23. The method of claim 20 wherein the sweetener is high fructose corn syrup of about 71% fructose.

24. The method of claim 20 wherein about 8-11% by weight flavor blend is mixed with about 34-37% by weight high fructose corn syrup and about 50-55% by weight water to make the sweetened flavored syrup.

25. The method of claim 20 wherein about 21-22% by weight sweetened syrup is mixed with about 79 to about 78% by weight milk of about 0.25 of 1% to about 4.2% butterfat.

26. The method of claim 20 wherein the syrup-milk mixture is pasteurized at about 166°-186° F. for about 17-120 seconds.

27. The method of claim 20 wherein the pasteurized product is homogenized at 500-1000 p.s.i.

28. A method of making a flavored fluid dairy product comprising the steps of:
   (a) mixing sweetener, water and a dry flavored powder selected from the group consisting of lactalbumin, and mixtures of casein and lactalbumin, and kappa carrageenan to produce sweetened flavored syrup;
   (b) placing a predetermined amount of milk having a prestandardized butterfat content into a pasteurizing kettle;
   (c) heating the milk to a temperature of at least about 80° F.;
   (d) adding the syrup to the warm milk with mixing and continued heating; and
   (e) heating the milk-syrup mixture at about 140°-160° F. for about 30 minutes.

29. The method of claim 28 wherein the hot pasteurized product is homogenized at 500-1000 p.s.i. and rapidly cooled to about 40° F. before packaging.

30. A process for making a stable, flavored milk comprising the steps of:
   (a) mixing dry lactose, lactalbumin, casein, and dry stabilizers including kappa carrageenan and water to produce a liquid stabilization system;
   (b) dispersing the dry ingredients in the water to form an aqueous system;
   (c) adding the liquid stabilization system to milk;
   (d) adding sweeteners to the stabilized milk;
   (e) adding flavoring material to the sweetened, stabilized milk;
   (f) pasteurizing the flavored, sweetened, stabilized mixture; and
   (g) cooling the flavored, sweetened, stabilized mixture.

* * * * *

UNITED STATES PATENT AND TRADEMARK OFFICE
CERTIFICATE OF CORRECTION

PATENT NO. : 5,290,582
DATED : March 1, 1994
INVENTOR(S) : Dressel et al

It is certified that error appears in the above-indentified patent and that said Letters Patent is hereby corrected as shown below:

Column 1, line 17, "Br" should be -- for --;

Line 19, "§131 110" should be -- §131.110 --;

Line 60, "Official Analytical" should be -- Official Methods of Analysis of the Association of Official Analytical --;

Line 63, "wilson" should be -- Wilson --.

Column 2, line 18, should read -- (i) If vitamins are added, the phrase "vitamin A" or "vitamin A added", or "vitamin D" or "vitamin D added", --;

Column 7, line 28, "et sec." should read -- *et seq.* --.

Column 9, Line 17, "2) the" should read -- 2) The --;

UNITED STATES PATENT AND TRADEMARK OFFICE
CERTIFICATE OF CORRECTION

PATENT NO. : 5,290,582
DATED : March 1, 1994
INVENTOR(S) : Dressel et al

It is certified that error appears in the above-indentified patent and that said Letters Patent is hereby corrected as shown below:

Column 10, line 5, "lactalbumin 2.97%" should read -- lactalbumin/2.97% --;

Line 39, "for" should read -- from --.

Column 11, after line 23 which reads "and mixtures of lactalbumin and casein, and", the following should appear:

-- (c) filler material selected from the group consisting of nutritive sweeteners, dairy derived solids and mixtures thereof to bring the flavored, blended, powder to 100% --;

Line 29, before "sweetened" should appear:

-- and kappa carrageenan to produce a --.

Signed and Sealed this

Twentieth Day of June, 1995

Attest:

BRUCE LEHMAN

Attesting Officer     Commissioner of Patents and Trademarks